(12) United States Patent
Wasada et al.

(10) Patent No.: US 10,012,134 B2
(45) Date of Patent: Jul. 3, 2018

(54) INTERNAL COMBUSTION ENGINE (71) Applicant: MAZDA MOTOR CORPORATION, Hiroshima (JP)

(72) Inventors: Mitsunori Wasada, Hiroshima (JP); Tsuyoshi Yamamoto, Hiroshima (JP); Yasushi Nakahara, Higashihiroshima (JP); Takashi Youso, Hiroshima (JP); Hiroaki Abe, Hiroshima (JP); Takaaki Nagano, Higashihiroshima (JP); Atsushi Inoue, Hiroshima (JP); Kazuhiro Nagatsu, Hiroshima (JP); Takashi Kaminaga, Hiroshima (JP); Tatsuya Fujikawa, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 60 days.

(21) Appl. No.: 15/361,511

(22) Filed: Nov. 28, 2016

(65) Prior Publication Data
US 2017/0167360 A1 Jun. 15, 2017

(30) Foreign Application Priority Data

Dec. 10, 2015 (JP) ................. 2015-240745

(51) Int. Cl.
*F02B 23/10* (2006.01)
*H01T 13/20* (2006.01)
(Continued)

(52) U.S. Cl.
CPC ............ *F02B 23/101* (2013.01); *F02F 1/242* (2013.01); *F02F 3/285* (2013.01); *F02P 15/02* (2013.01);
(Continued)

(58) Field of Classification Search
CPC .............. F02B 23/101; F02B 2023/085; F02B 2023/102; F02B 2023/103;
(Continued)

(56) References Cited

U.S. PATENT DOCUMENTS

| 4,901,687 A | * | 2/1990 | Jones | H01T 21/02 |
| | | | | 123/169 R |
| 4,989,557 A | * | 2/1991 | Penney | H01T 13/08 |
| | | | | 123/169 EL |

(Continued)

FOREIGN PATENT DOCUMENTS

| JP | 550-026902 A | 3/1975 |
| JP | H07-42433 U | 8/1995 |

(Continued)

*Primary Examiner* — Thomas Moulis
*Assistant Examiner* — John Bailey
(74) *Attorney, Agent, or Firm* — Studebaker & Brackett PC (57) ABSTRACT

Injection of the fuel by the injector 43 creates a gas flow in the combustion chamber. The gas expands in a radial fashion from an axis of a cylinder toward a radial outside of the cylinder, and then flows from the radial outside along the cylinder head bottom face 221 toward the axis of the cylinder. The spark plug 41 has a gap positioned away from the axis of the cylinder toward the radial outside of the cylinder at a predetermined distance, and placed radially inwardly from a position opposite a rim of an opening of the cavity 242. A side electrode extends to be oriented in a direction perpendicular to the flow of the gas along the cylinder head bottom face. The gap has a center positioned near the cylinder head bottom face, and closer to an interior of a combustion chamber than to the cylinder head bottom face.

14 Claims, 5 Drawing Sheets

(51) Int. Cl.
*F02F 1/24* (2006.01)
*F02P 15/02* (2006.01)
*F02F 3/28* (2006.01)
*F02B 23/08* (2006.01)

(52) U.S. Cl.
CPC ........ H01T 13/20 (2013.01); *F02B 2023/085* (2013.01)

(58) Field of Classification Search
CPC .......... F02B 2023/106; F02B 2023/107; F02B 2023/108; F02F 1/242; F02F 3/285; F02P 15/02; H01T 13/20
USPC ....... 123/295, 305, 309, 310, 638, 301, 306, 123/211, 648; 92/213
See application file for complete search history.

(56) References Cited

U.S. PATENT DOCUMENTS

| | | | | |
|---|---|---|---|---|
| 5,261,367 A * | 11/1993 | Yamamoto | ............... | F02B 23/08 123/309 |
| 5,960,767 A * | 10/1999 | Akimoto | ............... | F02B 23/101 123/298 |
| 6,267,107 B1 * | 7/2001 | Ward | ............... | F02B 17/00 123/162 |
| 6,543,408 B1 * | 4/2003 | Ernst | ............... | F02B 17/005 123/295 |
| 6,575,132 B1 * | 6/2003 | Ernst | ............... | F02B 17/005 123/295 |
| 6,748,917 B1 * | 6/2004 | Hoffmann | ............... | F02B 17/005 123/295 |
| 7,441,536 B2 * | 10/2008 | Bertsch | ............... | F02B 17/005 123/298 |
| 7,506,631 B2 * | 3/2009 | Altenschmidt | ....... | F02B 17/005 123/298 |
| 8,288,931 B2 * | 10/2012 | Fukuzawa | ............... | H01T 13/39 123/169 EL |
| 8,468,998 B2 * | 6/2013 | Straub | ............... | F02B 23/0624 123/298 |
| 2001/0003281 A1 * | 6/2001 | Mori | ............... | F02B 23/101 123/305 |
| 2001/0054398 A1 * | 12/2001 | Morikawa | ............... | F02B 23/104 123/65 VB |
| 2002/0014219 A1 * | 2/2002 | Suzuki | ............... | F02B 17/005 123/305 |
| 2002/0073956 A1 * | 6/2002 | Suzuki | ............... | F02B 23/101 123/298 |
| 2002/0157629 A1 * | 10/2002 | Inagaki | ............... | F02F 1/242 123/169 PA |
| 2003/0000494 A1 * | 1/2003 | Kremer | ............... | F02B 61/04 123/193.1 |
| 2003/0209223 A1 * | 11/2003 | Armstrong | ............... | F02D 37/02 123/305 |
| 2003/0221658 A1 * | 12/2003 | Hiraya | ............... | F02B 23/10 123/279 |
| 2004/0211388 A1 * | 10/2004 | Hiraya | ............... | F02B 17/005 123/276 |
| 2005/0241612 A1 * | 11/2005 | Ward | ............... | F02B 23/08 123/301 |
| 2006/0032478 A1 * | 2/2006 | Tayama | ............... | F02B 23/101 123/305 |
| 2006/0213480 A1 | 9/2006 | Inoue et al. | | |
| 2006/0231063 A1 * | 10/2006 | Matsubara | ............... | F02B 23/10 123/295 |
| 2007/0056553 A1 * | 3/2007 | Kohler | ............... | F02B 23/101 123/295 |
| 2007/0261664 A1 * | 11/2007 | Altenschmidt | ....... | F02B 17/005 123/298 |
| 2008/0022967 A1 * | 1/2008 | Tanaka | ............... | F02B 23/101 123/305 |
| 2008/0092838 A1 * | 4/2008 | Takeuchi | ............... | H01T 13/18 123/169 R |
| 2008/0092839 A1 * | 4/2008 | Hanashi | ............... | H01T 13/18 123/169 R |
| 2008/0135016 A1 * | 6/2008 | Ashizawa | ............... | F02B 23/101 123/301 |
| 2009/0013962 A1 * | 1/2009 | Ashizawa | ............... | F02B 23/101 123/306 |
| 2009/0194066 A1 * | 8/2009 | Ashizawa | ............... | F02B 17/005 123/295 |
| 2009/0319156 A1 * | 12/2009 | Fujikawa | ............... | F02B 23/104 701/103 |
| 2010/0175673 A1 * | 7/2010 | Ward | ............... | F01L 1/022 123/661 |
| 2012/0216776 A1 * | 8/2012 | Nagatsu | ............... | F02B 23/101 123/305 |
| 2014/0123934 A1 * | 5/2014 | Schouweiler, Jr. | ... | F02B 17/005 123/295 |

FOREIGN PATENT DOCUMENTS

| | | | |
|---|---|---|---|
| JP | 2002-188448 A | 7/2002 | |
| JP | 2003-328759 A | 11/2003 | |
| JP | 2004-011441 A | 1/2004 | |
| JP | 2004-190530 A | 7/2004 | |
| JP | 2006-083765 A | 3/2006 | |
| JP | 2006-274829 A | 10/2006 | |
| JP | 2007-170273 A | 7/2007 | |
| WO | 2007/061020 A1 | 5/2007 | |

* cited by examiner

INTERNAL COMBUSTION ENGINE

CROSS-REFERENCE TO RELATED APPLICATION

This application claims priority to Japanese Patent Application No. 2015-240745 filed on Dec. 10, 2015, the entire disclosure of which is incorporated by reference herein.

BACKGROUND

The present disclosure relates to a structure of a combustion chamber for an internal combustion engine.

Japanese Utility Model Publication No. H07-42433 discloses an engine creating a strong tumble flow in a combustion chamber to improve its fuel economy. Specifically, this engine creates the strong tumble flow in the combustion chamber, using intake air flowing from an intake port into a cylinder, to homogenize fuel ejected to the intake port and promote combustion.

This engine is provided with a spark plug aligned with an axis of the cylinder over a cylinder head bottom face of a cylinder head. The spark plug has a side electrode extending to be oriented perpendicular to the tumble flow to reduce missing sparks of the spark plug. Such an orientation of the side electrode reduces the risk of the spark, ignited by the spark plug, hitting the side electrode when the spark is blown by the tumble flow.

SUMMARY

The engine cited in the publication creates the strong tumble flow in the combustion chamber, using a flow of intake air from the intake port into the cylinder. The flow in the combustion chamber is not limited to the tumble flow. For example, in contrast to the engine disclosed in the publication, fuel would be directly injected into a combustion chamber so that the injection of the fuel could create a predetermined flow in the combustion chamber. Through a careful arrangement of spark plugs depending on a state of the flow to be generated in the combustion chamber, ignitability of air-fuel mixture has to be optimized.

The present disclosure is conceived in view of the above points, and improves ignitability of air-fuel mixture through a careful arrangement of spark plugs.

A technique disclosed here relates to an internal combustion engine including: a piston inserted into a cylinder and having a cavity on a top face, of the piston, defining the combustion chamber, the cavity being formed symmetrically with respect to an axis of the cylinder; an injector provided to a cylinder head and aligned with the axis, of the cylinder, on a cylinder head bottom face defining the combustion chamber, the injector being configured to inject fuel into the cavity; and a spark plug including a center electrode and side electrode, the spark plug being configured to ignite air-fuel mixture in the combustion chamber.

The injection of the fuel by the injector creates a flow of gas in the combustion chamber, the gas expanding in a radial fashion from the axis of the cylinder along a surface of the cavity toward a radial outside of the cylinder, and then flowing from the radial outside along the cylinder head bottom face of the cylinder head toward the axis of the cylinder.

The spark plug has a gap between the center electrode and the side electrode so that the gap is positioned in the flow of the gas from the radial outside along the cylinder head bottom face toward the axis of the cylinder. The gap is positioned, at the cylinder head bottom face, away from the axis of the cylinder toward the radial outside at a predetermined distance, and placed radially inwardly from a position opposite a rim of an opening of the cavity. The side electrode extends to be oriented in a direction perpendicular to the flow of the gas from the radial outside along the cylinder head bottom face toward the axis of the cylinder. The gap has a center positioned near the cylinder head bottom face, and closer to an interior of the combustion chamber than to the cylinder head bottom face.

According to this configuration, the injector, provided to the cylinder head bottom face of the cylinder head and aligned with the axis of the cylinder, injects the fuel toward the cavity provided on the top face of the piston. This injection of the fuel creates a flow of gas in the combustion chamber. The gas expands in a radial fashion from the axis of the cylinder along a surface of the cavity toward a radial outside, and then flows from the radial outside along the cylinder head bottom face toward the axis of the cylinder. Such a gas flow homogenizes the ejected fuel and promotes combustion.

The spark plug has a gap between the center electrode and the side electrode so that the gap is positioned in the flow of the gas from the radial outside along the cylinder head bottom face of the cylinder head toward the axis of the cylinder. Specifically, the spark plug is positioned, at the cylinder head bottom face, away from the axis of the cylinder toward the radial outside at a predetermined distance, and placed radially inwardly from a position opposite a rim of an opening of the cavity. The fuel expands in the radial fashion from the axis of the cylinder along the surface of the cavity toward the radial outside. The fuel then flows, following the gas flow from the radial outside along the cylinder head bottom face toward the axis of the cylinder. Until reaching near the spark plug, the fuel is sufficiently vaporized and mixed with air. Such a feature successfully reduces variation in concentration of air-fuel mixture for each cycle or between cylinders. The spark plug, placed in a predetermined position, ignites homogeneous air-fuel mixture.

The side electrode of the spark plug extends to be oriented in a direction perpendicular to the flow of the gas from the radial outside along the cylinder head bottom face toward the axis of the cylinder. Such a feature reduces the risk that the side electrode disturbs the gas flow. Note that the orientation of the side electrode shaped into L is defined by a direction in which a portion of the side electrode opposing the center electrode extends. The side electrode is beneficially oriented in a range of ±30°, using, as a reference, the orientation of the side electrode extending "in a direction perpendicular to the gas flowing from the radial outside along the cylinder head bottom face toward the axis of the cylinder."

Furthermore, the gap of the spark plug is positioned near the cylinder head bottom face, and closer to the interior of the combustion chamber than to the cylinder head bottom face. Such features contribute to effectively providing ignition energy to the air-fuel mixture flowing along the cylinder head bottom face, enhancing ignitability of the air-fuel mixture. Here, the statement "the gap of the spark plug is positioned near the cylinder head bottom face" may also be defined that, while the piston is positioned at the compression top dead center, the center of the gap of the spark plug is positioned closer to the cylinder head bottom face of the cylinder head than to the surface of the cavity on the top face of the piston.

As a result, the configuration implements stable ignition of the air-fuel mixture, and allows the gas flow in the combustion chamber to promote combustion.

The injector may inject the fuel when the piston reaches near a compression top dead center.

Injecting the fuel near the compression top dead center may create a flow of the air-fuel mixture following the shape of the cavity of the piston. Such a feature contributes to reliably guiding the fuel close to the gap of the spark plug.

The internal combustion engine may further include: a first spark plug acting as the spark plug, and a second spark plug placed across the axis of the cylinder from the first spark plug, and including a center electrode and the side electrode, wherein the second spark plug may have a gap between the center electrode and the side electrode of the second spark plug so that the gap may be positioned in the flow of the gas from the radial outside along the cylinder head bottom face toward the axis of the cylinder, the gap of the second spark plug may be positioned, at the cylinder head bottom face, away from the axis of the cylinder toward the radial outside at the predetermined distance, and placed radially inwardly from a position opposite the rim of the opening of the cavity the side electrode of the second spark plug extends to be oriented in a direction perpendicular to the flow of the gas from the radial outside along the cylinder head bottom face toward the axis of the cylinder, and the gap of the second spark plug may have a center positioned near the cylinder head bottom face, and closer to the interior of the combustion chamber than to the cylinder head bottom face.

The first spark plug and the second spark plug are arranged across the axis of the cylinder from each other. Moreover, both the first spark plug and the second spark plug are positioned away from the injector toward the radial outside at the same predetermined distance. More beneficially, in the second spark plug, the center of the gap observed in the direction of the axis of the cylinder is positioned on an extension line of a straight line connecting the center of the gap of the first spark plug and the central axis of the cylinder. As the air-fuel mixture reaching near the first spark plug becomes homogeneous air-fuel mixture as described before, the air-fuel mixture reaching near the second spark plug is also sufficiently vaporized and mixed with air until the fuel reaches the second spark plug. Such a feature successfully reduces variation in concentration of air-fuel mixture for each cycle or between cylinders.

Similar to the case of the first spark plug, the side electrode of the second spark plug extends to be oriented in a direction perpendicular to the flow of the gas from the radial outside along the cylinder head bottom face toward the axis of the cylinder. Such a feature may reduce the risk that the side electrode of the second spark plug disturbs the gas flow. Furthermore, the gap of the second spark plug is also positioned near the cylinder head bottom face, and closer to the interior of the combustion chamber than to the cylinder head bottom face. Such features contribute to effectively providing ignition energy to the air-fuel mixture, enhancing ignitability of the air-fuel mixture.

Hence, the first spark plug and the second spark plug implement stable ignition, and the two spark plugs, arranged across the axis of the cylinder from each other, have ignition. The ignition with two spark plugs implements quick combustion. This quick combustion enhances the thermal efficiency of the internal combustion engine.

The cylinder head may have two intake ports and two exhaust ports. One of the first spark plug or the second spark plug may be placed between the two intake ports, and an other one of the first spark plug or the second spark plug may be placed between the two exhaust ports.

The injector is aligned with the axis of the cylinder, and each of the two spark plugs is arranged to one of the intake side or the exhaust side to be symmetrical with respect to the axis of the cylinder. Such an arrangement improves a layout of the injector and the two spark plugs on the cylinder head.

The side electrode of the first spark plug and the side electrode of the second spark plug may each face an opposite direction.

The injector aligned with the axis of the cylinder injects the fuel, and the injected fuel creates a flow of gas in the combustion chamber. The gas expands in a radial fashion at 360 degrees around the axis of the cylinder along a wall of the cavity, and flows along the cylinder head bottom face of the cylinder head to converge toward the axis of the cylinder from 360 degrees around the axis of the cylinder. The side electrodes of the two spark plugs, arranged on the cylinder head bottom face of the cylinder head, each face an opposite direction. Such an arrangement allows the side electrodes to receive the gas flowing in all directions in the combustion chamber, contributing to further stabilizing ignitability of air-fuel mixture and to beneficially stabilizing combustion.

The spark plug may be positioned in a center between the injector and an interior surface of the cylinder.

Such positioning allows the air-fuel mixture to be homogenized until the fuel reaches near the spark plug, contributing to further stabilizing ignitability of the air-fuel mixture. Moreover, this positioning keeps the spark plug and the interior surface of the cylinder distant from each other. Thanks to the positioning, a flame generated by the spark plug easily spreads around the spark plug. This is beneficial in stabilizing combustion. In particular, a configuration including the first and second sparkplugs is beneficial in quick combustion.

The cavity may include a projection and a depressed portion, the projection rising toward the cylinder head bottom face on the axis of the cylinder, and the depressed portion, having a circumferential side surface inclined with respect to the axis of the cylinder, to be depressed around the projection and to have a diameter expanding from a bottom of the cavity toward the opening.

Such features allow the fuel, injected from the injector aligned with the axis of the cylinder, to flow along the projection of the cavity and reach the depressed portion around the projection. Then, the fuel flows along the surface of the cavity, and expands in a radial fashion from the axis of the cylinder toward the radial outside. The projection and the depressed portion are beneficial in creating a flow of the gas expanding in a radial fashion from the axis of the cylinder along the surface of the cavity toward the radial outside. Eventually, the projection and the depressed portion are beneficial in creating a flow of the gas from the radial outside along the cylinder head bottom face toward the axis of the cylinder.

The cylinder head bottom face may be shaped into a pentroof having slopes each rising from one of an intake side or an exhaust side toward the axis of the cylinder.

Such a configuration is beneficial in creating a flow of gas from the radial outside along the cylinder head bottom face toward the axis of the cylinder, after the gas flow has expanded in a radial fashion from the axis of the cylinder along the surface of the cavity toward the radial outside. The spark plug is placed in a position on the rising cylinder head bottom face, stabilizing combustion as well as ignitability of air-fuel mixture.

A distance between the center of the gap and the cylinder head bottom face may be set in a range from 0 mm to 2 mm.

If the electrodes of the spark plug excessively protrude from the cylinder head bottom face, these electrodes are exposed to a high temperature and absorbs heat. As a result, the electrodes inevitably become a hot spot to cause pre-ignition. Meanwhile, if the electrodes of the spark plug protrude insufficiently (i.e. if the distance between the cylinder head bottom face and the center of the gap is shorter than 0 mm), the air-fuel mixture does not pass through the electrodes, causing a failure or a difficulty in ignition.

The distance from the cylinder head bottom face to the center of the gap between the electrodes of the spark plug is set in a range from 0 mm to 2 mm. Such setting allows the electrodes of the spark plug to protrude for an appropriate distance.

Note that the gap of the spark plug is beneficially set in a range from 0.7 mm to 1.5 mm. An excessively large gap inevitably requires a large amount of current for discharge. An excessively small gap causes a missing spark; that is, the electrodes absorb heat of a flame such that the flame is put out. As a result, it is difficult to ignite the air-fuel mixture.

DETAILED DESCRIPTION

Figure 1:
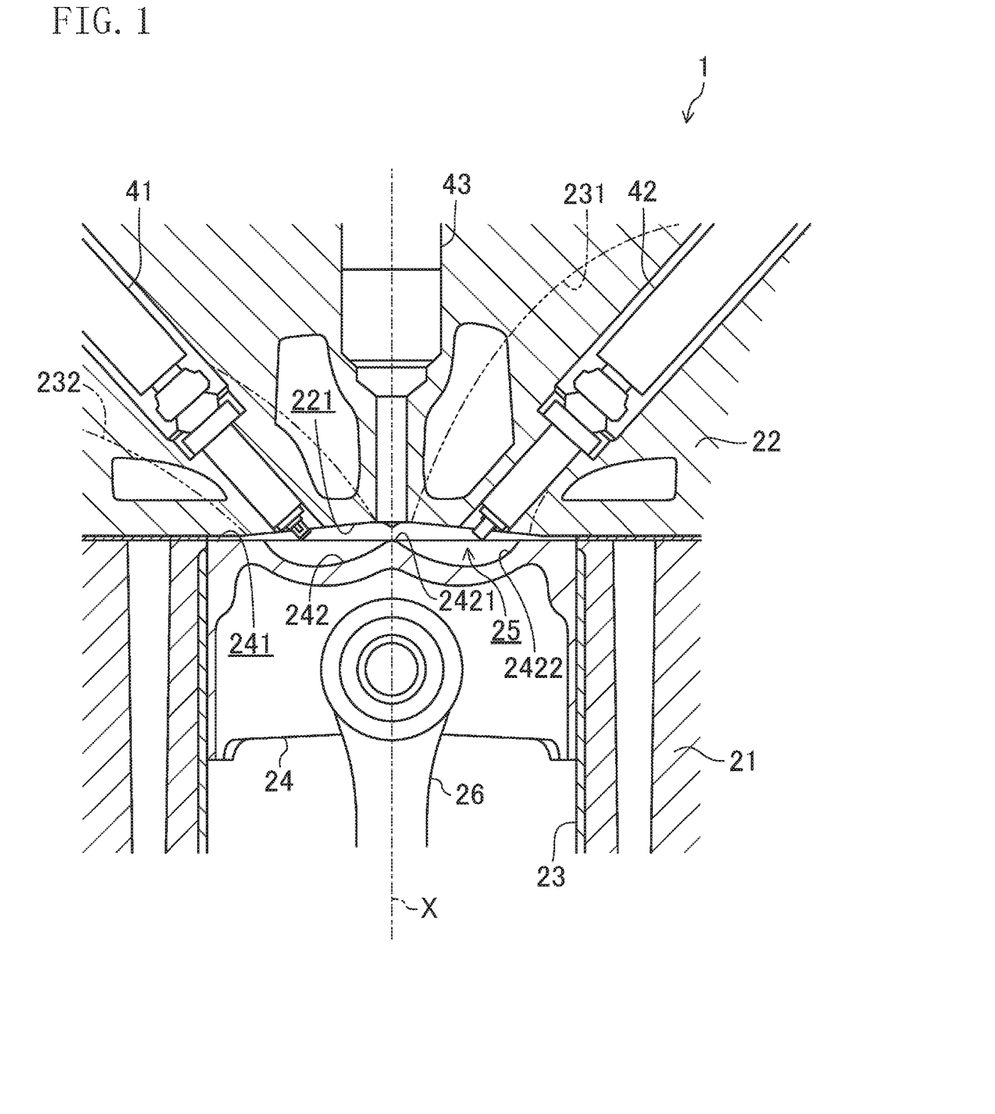
FIG. 1 is a cross-sectional view illustrating a configuration of a combustion chamber for an internal combustion engine.

Described below is a structure of a combustion chamber for an internal combustion engine, with reference to the drawings. Note that the description below is an example. FIG. 1 illustrates a structure of a combustion chamber for an internal combustion engine. An engine 1; namely a spark-ignited internal combustion engine, is for example transversely mounted in an engine compartment provided in the front of a vehicle such as a car. Details of how the engine is mounted are not shown. The engine 1 has an output shaft; namely a crankshaft, coupled to drive wheels via a not-shown transmission. The vehicle runs when the power of the engine 1 is transmitted to the drive wheels. Note that the engine 1 may be longitudinally mounted.

The engine 1 includes a cylinder block 21, and a cylinder head 22 placed on the cylinder block 21. Multiple cylinders 23 are provided in the cylinder block 21. In this example, the engine 1 has four cylinders 23. The four cylinders 23 are aligned along a crankshaft; that is in a direction perpendicular to the view in FIG. 1. Note that the engine 1 may have any number of cylinders and any cylinder arrangement.

In each of the cylinders 23, a piston 24 is inserted. The piston 24 is connected to the not-shown crankshaft via a connecting rod 26. The piston 24 is reciprocable in the cylinder 23. A top face 241 of the piston 24, a cylinder head bottom face 221 of the cylinder head 22, and an interior surface of the cylinder 23 define a combustion chamber 25.

The top face 241 of the piston 24 has a cavity 242 which is a depression formed on the top face 241. As illustrated in FIG. 1, the bottom view in FIG. 2, and FIG. 3, the cavity 242 is formed symmetrically with respect to an axis X of the cylinder 23.

The cavity 242 has a projection 2421. The projection 2421 is provided on the axis X of the cylinder 23. The projection 2421 is shaped substantially conical. The projection 2421 rises upward from a bottom of the cavity 242 along the axis X of the cylinder 23 (i.e. toward the cylinder head bottom face 221 of the cylinder head 22). As illustrated in FIG. 1 and the bottom view of FIG. 2, the projection 2421 has an upper end positioned substantially as high as the top face 241 of the cavity 242.

The cavity 242 further includes a depressed portion 2422 provided around the projection 2421. The depressed portion 2422 covers all around the projection 2421. The depressed portion 2422 has a circumferential side surface inclined with respect to the axis X of the cylinder 23 so that an inner diameter of the cavity 242 gradually expands from a bottom toward an opening of the cavity 242 at the top face 241 of the piston 24.

Figure 3:
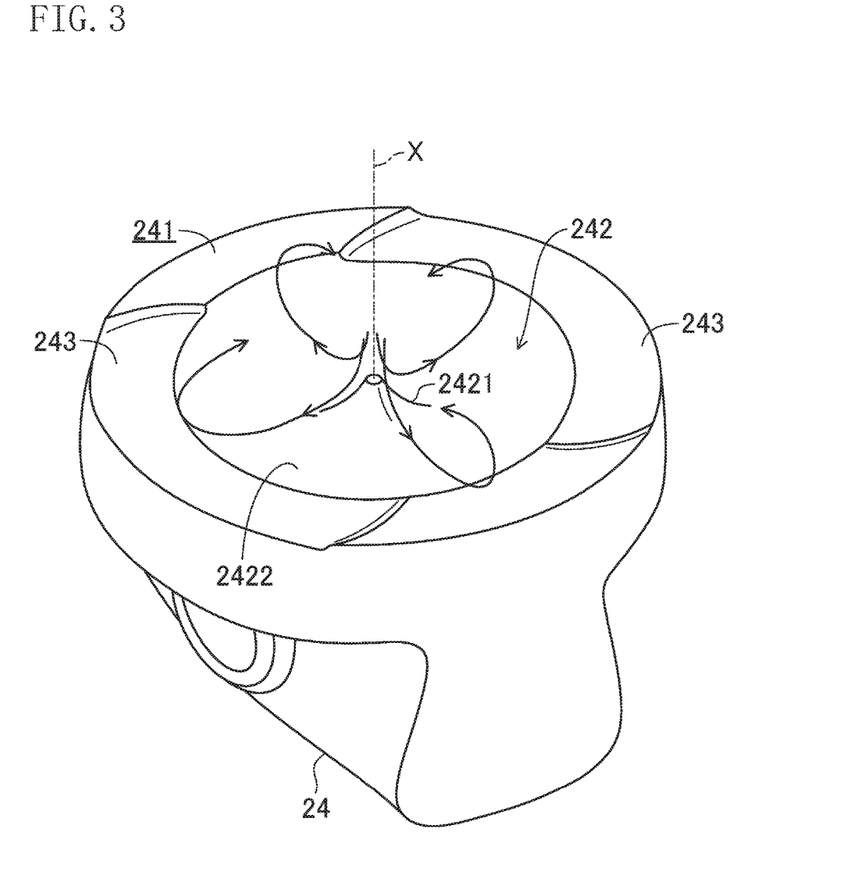
FIG. 3 is a perspective view illustrating a shape of a cavity provided on a top face of a piston, and a flow of gas in the combustion chamber.

The piston 24 has the top face 241 formed flat around the cavity 242. As illustrated in FIG. 3, the top face 241 has a portion provided with valve recesses 243 for an intake valve 31 and an exhaust valve 32 to be described later.

Figure 2:
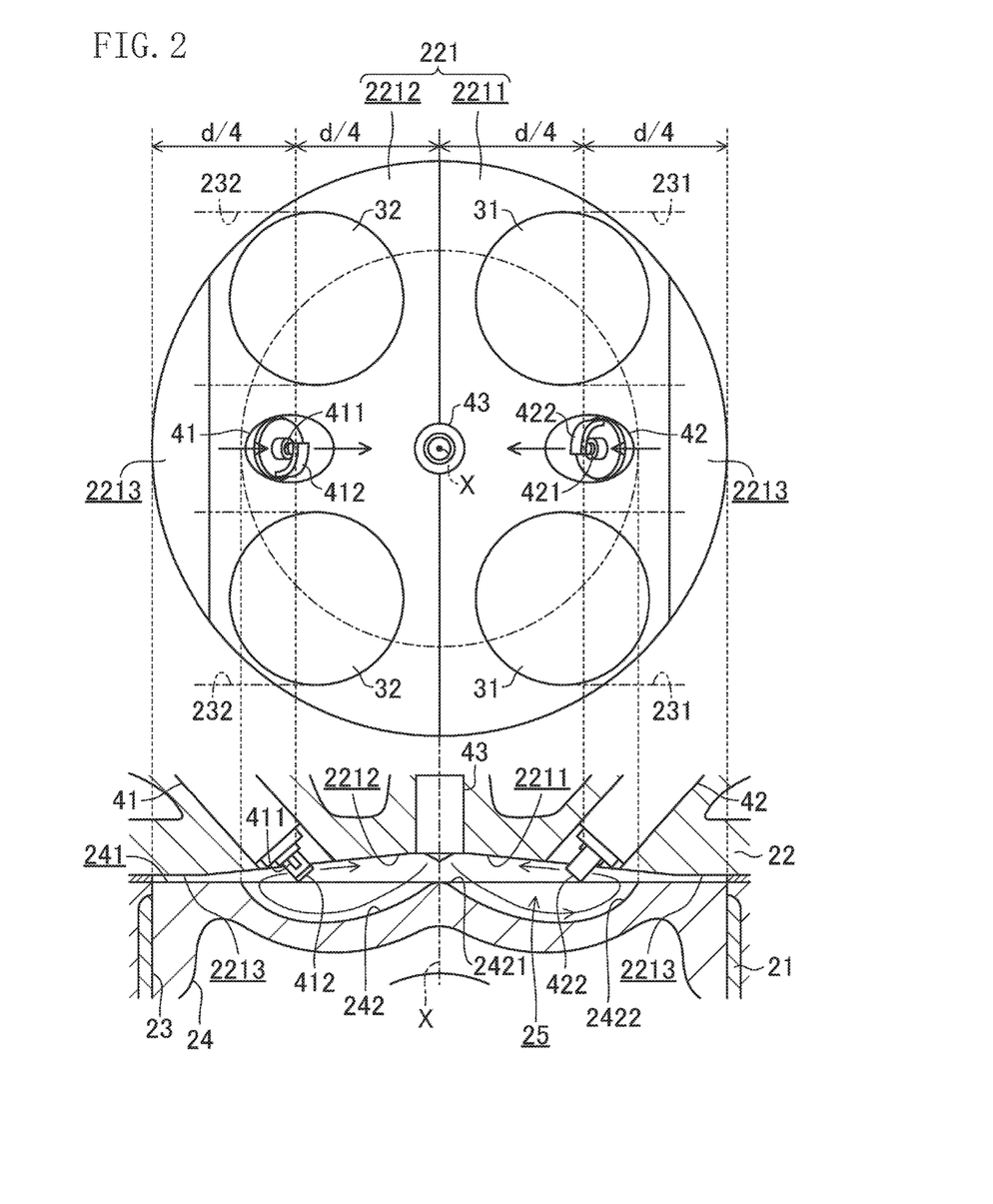
FIG. 2 includes a view on the top illustrating a cylinder head bottom face of a cylinder head, and a magnified cross-sectional view on the bottom illustrating a part of the combustion chamber.

As FIGS. 1 and 2 imaginarily illustrate, the cylinder head 22 has two intake ports 231 formed for each cylinder 23. Each of the intake port 231 communicates with a combustion chamber 25. As illustrated in FIG. 2, each intake port 231 is provided with an intake valve 31 which may block the combustion chamber 25 from the intake port 231. The two intake valves 31 are arranged along the crankshaft of the engine 1. The intake valves 31 are driven by a not-shown intake valve train, and open and close the intake port 231 with predetermined timing.

As FIGS. 1 and 2 imaginarily illustrate, the cylinder head 22 also has two exhaust ports 232 formed for each cylinder 23. Each of the exhaust port 232 communicates with the combustion chamber 25. Each exhaust port 232 is provided with an exhaust valve 32 which may block the combustion chamber 25 from the exhaust port 232. The two exhaust valves 32 are arranged along the crankshaft of the engine 1. The exhaust valves 32 are driven by a not-shown exhaust valve train, and opens and closes the exhaust port 232 with predetermined timing.

As illustrated in FIG. 2, the cylinder head bottom face 221 of the cylinder head 22 includes ramps 2211 and 2212. The ramp 2211 is a rising slope from the intake side toward the axis X of the cylinder 23. The ramp 2212 is a rising slope from the exhaust side toward the axis X of the cylinder 23. The cylinder head bottom face 221 of the cylinder head 22 is shaped into a so-called pentroof. The cylinder head bottom face 221 of the cylinder head 22 further includes flat faces 2213 each provided to one of a periphery of the ramp 2211 to the intake side and a periphery of the ramp 2212 to the exhaust side. The flat faces 2213 face the top face 241 of the piston 24.

Here, this engine 1 has a high geometrical compression ratio ε (e.g. ε≥15) in order to enhance thermal efficiency. As illustrated in FIG. 1, the combustion chamber 25 has a small volume when the piston 24 reaches a top dead center. Note that the technique disclosed here may be applicable to an engine having a low geometrical compression. The engine 1 may have a geometrical compression ratio ε of 10 or higher.

The cylinder head 22 is provided with an injector 43 for each cylinder 23. The injector 43 is aligned with the axis X of the cylinder 23. The injector 43 has an orifice provided on the cylinder head bottom face 221 of the cylinder head 22, and positioned where the ramp 2211 to the intake side and the ramp 2212 to the exhaust side meet with each other. The injector 43 directly injects fuel (here, gasoline or fuel containing gasoline) into the cylinder 23. The injector 43 may have any configuration. Examples of the configuration may be of a fuel injector having multiple orifices. In accordance with a fuel injection pulse from a not-shown engine controller, the injector 43 injects, into the cylinder 23, a predetermined amount of the fuel with predetermined timing. Depending on a running state of the engine 1, the injector 43 injects the fuel into the combustion chamber 25 when the piston 24 reaches near a compression top dead center. As the arrows of the bottom view of FIG. 2 and FIG. 3 show, such a feature allows the injector 43 to inject the fuel downward toward the cavity 242 of the piston 24 positioned near the compression top dead center. The injection of the fuel by the injector 43 creates a flow of gas in the combustion chamber 25. As the arrows of the bottom view of FIG. 2 and FIG. 3 show, the gas flows downward along the projection 2421 provided in the cavity 242 and positioned on axis X. The gas then flows in a radial fashion from the axis X of the cylinder 23 toward a radial outside of the cylinder 23 along a cavity surface on the depressed portion 2422 of the cavity 242. After that, the gas reaches an opening of the cavity 242, and flows from a radial outside of the cylinder 23 along the cylinder head bottom face 221 shaped into a pentroof and provided on the cylinder head 22; that is, along the ramp 2211 to the intake side and the ramp 2212 to the exhaust side. The gas then flows toward the axis X of the cylinder 23.

The cylinder head 22 is also provided with spark plugs 41 and 42 for each cylinder 23. In this engine 1, one cylinder 23 is provided with two spark plugs; namely the first spark plug 41 and the second spark plug 42. The first spark plug 41 and the second spark plug 42 have the same heat range. Note that the two spark plugs to be used may have different heat ranges. The first spark plug 41 is placed to the exhaust side across from the axis X of the cylinder 23. The second spark plug 42 is placed to the intake side across from the axis X of the cylinder 23. In accordance with a spark signal from the engine controller, each of the first spark plug 41 and the second spark plug 42 ignites air-fuel mixture with predetermined timing, for example, simultaneously.

As illustrated in the top view of FIG. 2, the first spark plug 41 is positioned between the two exhaust ports 232. As illustrated in FIG. 1, the first spark plug 41 is provided to the cylinder head 22 from above downward, and angled toward the axis X of the cylinder 23. The first spark plug 41 has a gap between a center electrode 411 and a side electrode 412. The gap is positioned away from the axis X of the cylinder 23 at a predetermined distance toward a radial outside of the cylinder 23, and placed radially inwardly from a position opposite a rim of the opening, of the cavity 242, indicated by a chain line in the top view of FIG. 2. More specifically, the gap of the first spark plug 41 is positioned in a center between the axis X of the cylinder 23 and an interior surface of the cylinder 23. The gap of the first spark plug 41 is positioned away from the axis X of the cylinder 23 at d/4 where d is an inner diameter of the cylinder 23.

Figure 4:
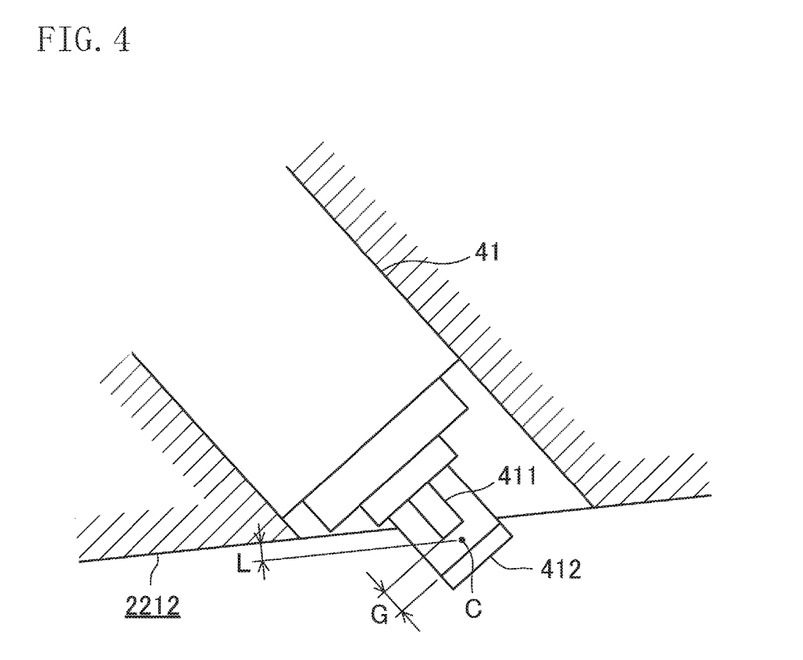
FIG. 4 is a magnified view illustrating placement of an electrode of a spark plug.

Furthermore, the gap of the first spark plug 41 is positioned near the cylinder head bottom face 221, and closer to the interior of the combustion chamber 25 than to the cylinder head bottom face 221 of the cylinder head 22. Specifically, with the piston 24 positioned at the compression top dead center, the center of the gap of the first spark plug 41 is positioned closer to the cylinder head bottom face 221 of the cylinder head 22 than to the surface of the cavity 242 on the top face of the piston 24. More specifically, as illustrated in a magnified view in FIG. 4, the first spark plug 41 is provided to the cylinder head 22 so that a distance L between a center C of the gap of the first spark plug 41 and a cylinder head bottom face (here, the ramp 2212 to the exhaust side) of the cylinder head 22 is a predetermined distance. The distance L between the center C of the gap and the cylinder head bottom face (i.e. the ramp 2212) of the cylinder head 22 is set in a range of 1±1 mm. Note that a size G of the gap of the first spark plug 41 is set in a range from 0.7 mm to 1.5 mm. An excessively large gap inevitably requires a large amount of current for discharge. An excessively small gap causes a missing spark; that is, the electrodes absorb heat of a flame such that the flame is put out. As a result, it is difficult to ignite the air-fuel mixture.

Furthermore, the first spark plug 41 is provided to the cylinder head 22 so that the L-shaped side electrode 412 extends to be oriented in a direction perpendicular to the flow of the gas from a radial outside of the cylinder 23 along the cylinder head bottom face 221 toward the axis X of the cylinder 23, as illustrated in the top view of FIG. 2. Note that the orientation of the side electrode 412 is defined by a direction in which a portion of the side electrode 412 opposing the center electrode 411 extends. Specifically, in the top view of FIG. 2, the gas near the electrode of the first spark plug 41 flows from the left to the right in the view of FIG. 2. The side electrode 412 of the first spark plug 41 is oriented so that, with respect to this gas flow, the portion of the side electrode 412, opposing the center electrode 411, is oriented from the bottom upward in the top view of the FIG. 2. Note that the first spark plug 41 is provided to the cylinder head 22 so that the side electrode 412 is oriented in a range of ±30°, using, as a reference, the orientation of the side electrode 412 extending "in a direction perpendicular to a gas flow from the radial outside of the cylinder 23 along the cylinder head bottom face 221 toward the axis X of the cylinder 23."

As illustrated in the top view of FIG. 2, the second spark plug 42 is positioned between the two intake ports 231. As illustrated in FIG. 1, the second spark plug 42 is provided to the cylinder head 22 from above downward, and angled toward the axis X of the cylinder 23. Similar to the first spark plug 41, the second spark plug 42 has a gap between electrodes. The gap is positioned away from the axis X of the cylinder 23 at a predetermined distance toward the radial outside of the cylinder 23, and placed radially inwardly from a position opposite a rim of the opening, of the cavity 242, indicated by a chain line in the top view of FIG. 2. More specifically, the gap of the second spark plug 42 is positioned (i) in a center between the axis X of the cylinder 23 and an interior surface of the cylinder 23, and (ii) away from the axis X of the cylinder 23 at d/4. Hence, the first spark plug 41 and the second spark plug 42 are away from the injector 43 at the same distance. The gap of the first spark plug 41 and the gap of the second spark plug 42 are positioned on the same circumference of a circle with the axis X of the cylinder 23 centered.

Similar to the gap of the first spark plug 41, the gap of the second spark plug 42 is positioned near the cylinder head bottom face 221, and closer to the interior of the combustion chamber 25 than to the cylinder head bottom face 221 of the cylinder head 22. The second spark plug 42 is provided to the cylinder head 22 so that a distance between a center of the gap of the second spark plug 42 and a cylinder head bottom face (here, the ramp 2211 to the intake side) of the cylinder head 22 is a predetermined distance. Here, a detailed illustration shall be omitted. The distance between the center of the gap of the second spark plug 42 and the cylinder head bottom face 221 of the cylinder head 22 is also set in a range of 1±1 mm.

Furthermore, the second spark plug 42 is provided to the cylinder head 22 so that the L-shaped side electrode 422 extends to be oriented in a direction perpendicular to the flow of the gas from the radial outside of the cylinder 23 along the cylinder head bottom face 221 toward the axis X of the cylinder 23, as illustrated in FIG. 2. Specifically, in the top view of FIG. 2, the gas near the electrode of the second spark plug 42 flows from the right to the left in the view of FIG. 2. The side electrode 422 of the second spark plug 42 is oriented so that, with respect to this gas flow, the portion of the side electrode 422, opposing a center electrode 421, is oriented from the top downward in the top view of the FIG. 2. Hence, the side electrode 412 of the first spark plug 41 and the side electrode 422 of the second spark plug 42 each face the opposite direction. In other words, the side electrode 412 and the side electrode 422 are disposed 180° apart. Note that the second spark plug 42 is provided also to the cylinder head 22 so that the side electrode 422 is oriented in a range of ±30°, using, as a reference, the orientation of the side electrode 422 extending "in a direction perpendicular to the gas flowing from the radial outside of the cylinder 23 along the cylinder head bottom face 221 toward the axis X of the cylinder 23."

In this engine 1, the injector 43, placed on the cylinder head bottom face 221 of the cylinder head 22 and aligned with the axis X of the cylinder 23, injects the fuel toward the cavity 242 provided on the top face 241 of the piston 24. In particular, when the piston 24 is positioned near the compression top dead center, the injection of the fuel from the injector 43 creates a flow of the gas in the combustion chamber 25 as illustrated by the arrows in FIGS. 2 and 3. The gas expands in a radial fashion from the axis X of the cylinder 23 along a surface of the cavity 242 toward the radial outside of the cylinder 23. The gas then flows from the radial outside along the cylinder head bottom face 221 of the cylinder head 22 toward the axis X of the cylinder 23.

Here, the cavity 242 has: the projection 2421 projecting upward on the axis X of the cylinder 23; and the depressed portion 2422 depressing around the projection 2421 and having the circumferential side surface inclined toward the axis X of the cylinder 23 so that the inner diameter of the cavity 242 expands from its bottom with respect to an opening of the cavity 242. Meanwhile, the cylinder head bottom face 221 of the cylinder head 22 is shaped into a pentroof; that is, the cylinder head bottom face 221 forms rising slopes each from one of the intake side and the exhaust side toward the axis X of the cylinder 23. Such a shape of the combustion chamber facilitates the creation of the gas flow by the fuel injection.

The first spark plug 41 and the second spark plug 42 are arranged so that the gap between the center electrode 411 and the side electrode 412 and the gap between the center electrode 421 and the side electrode 422 are positioned in the flow of the gas from the radial outside of the cylinder 23 along the cylinder head bottom face 221 of the cylinder head 22 toward the axis X of the cylinder 23. Such an arrangement implements stable ignition.

Specifically, the gaps of the first spark plug 41 and the second spark plug 42 are positioned, at the cylinder head bottom face 221, away from the axis X of the cylinder 23 toward the radial outside of the cylinder 23 at a predetermined distance, and placed radially inwardly from a position opposite a rim of the opening of the cavity 242. Specifically, the gaps of the first spark plug 41 and the second spark plug 42 are positioned away from the axis X of the cylinder 23 at d/4. The fuel flows in the radial fashion from the axis X of the cylinder 23 along the surface of the cavity 242 toward the radial outside. The fuel then flows, following the gas flow from the radial outside of the cylinder 23 along the cylinder head bottom face 221 toward the axis X of the cylinder 23. Until reaching near the first spark plug 41 and the second spark plug 42, the fuel is sufficiently vaporized and mixed with air. Such a feature successfully reduces variation in concentration of air-fuel mixture for each cycle. The first spark plug 41 and the second spark plug 42 stably ignite burnable air-fuel mixture.

Moreover, the gaps of the first spark plug 41 and the second spark plug 42 are positioned away from the axis X of the cylinder 23 at d/4. Hence, the gaps are separated also from the interior surface of the cylinder 23 at d/4. Thanks this the positioning, a flame generated by the first spark plug 41 and the second spark plug 42 easily spreads around the spark plugs, beneficially stabilizing combustion. Continuous and stable ignition and combustion events by the first spark plug 41 and the second spark plug 42, and the above gas flow in the combustion chamber 25 may implement quick combustion events. The quick combustion enhances the thermal efficiency of the engine 1.

Moreover, the side electrode 412 of the first spark plug 41 and the side electrode 422 of the second spark plug 42 extend to be oriented in a direction perpendicular to the flow of the gas from the radial outside of the cylinder 23 along the cylinder head bottom face 221 toward the axis X of the cylinder 23. This orientation of the side electrodes 412 and 422 allows base portions of the L-shaped side electrodes 412 and 422 to be arranged perpendicularly to the gas flow with respect to the center electrodes 411 and 421 as illustrated in the top view of FIG. 2. Such an arrangement reduces the risk that the side electrodes 412 and 422 disturb the gas flow.

Furthermore, as illustrated in FIG. 3, the gas flows in the combustion chamber 25 at 360 degrees around the axis X of the cylinder 23. The side electrode 412 of the first spark plug 41 and the side electrode 422 of the second spark plug 42, each facing the opposite direction, may receive the gas flowing at 360 degrees around the axis X of the cylinder 23. Such a feature contributes to further stabilizing ignitability of air-fuel mixture and to beneficially stabilizing combustion.

Moreover, the gaps of the first spark plug 41 and the second spark plug 42 are positioned near the cylinder head bottom face 221, and closer to the interior of the combustion chamber 25 than to the cylinder head bottom face 221. Such features contribute to effectively providing ignition energy to the air-fuel mixture flowing along the cylinder head bottom face 221, enhancing ignitability of the air-fuel mixture.

Here, if the electrodes of the first spark plug 41 and the second spark plug 42 excessively protrude from the cylinder head bottom face 221, these electrodes are exposed to a high temperature and absorbs heat. As a result, the electrodes inevitably become hot spots to cause pre-ignition. Meanwhile, if the electrodes of the first spark plug 41 and the second spark plug 42 protrude insufficiently, the air-fuel mixture does not pass through the electrodes, causing a failure or a difficulty in ignition.

The distance between the cylinder head bottom face 221 and the centers of the gaps of the first spark plug 41 and the second spark plug 42 is set in a range from 0 mm to 2 mm. Such setting allows the electrodes of the first spark plug 41 and the second spark plug 42 to protrude for an appropriate distance. Note that studies conducted by, for example, the inventors of the present invention have found out that a higher compression ratio of the engine 1 causes more frequent pre-ignition events occurring when the electrodes of the first spark plug 41 and the second spark plug 42 protrude for a great distance. Hence, for the engine 1 having a high geometrical compression ratio, it will be more important to manage the protrusion distances of the electrodes of the first spark plug 41 and the second spark plug 42.

Furthermore, while the injector 43 is aligned with the axis X of the cylinder 23, the first spark plug 41 is placed between the two exhaust ports 232 and the second spark plug 42 is placed between the two intake ports 231. Such an arrangement improves a layout of the injector 43, the first spark plug 41, and the second spark plug 42 on the cylinder head 22.

Figure 5:
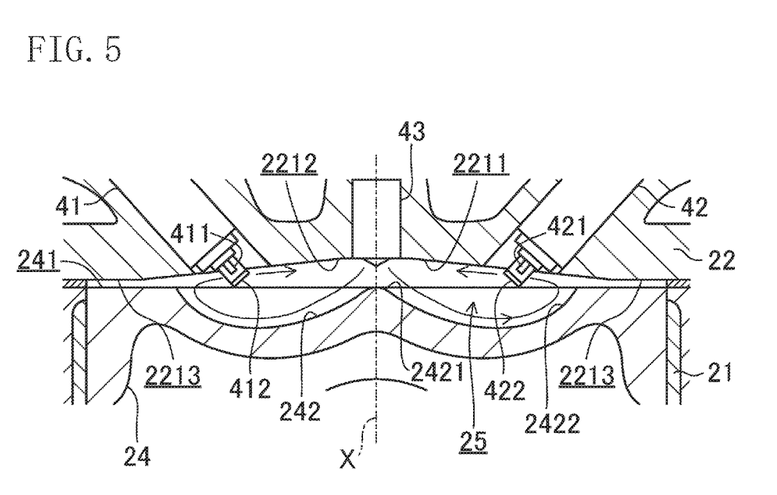
FIG. 5 is a magnified cross-sectional view of a portion of the combustion chamber showing an arrangement of spark plugs different from that illustrated in FIG. 2.

Note that, when the first spark plug 41 and the second spark plug 42 are installed, the side electrode 412 of the first spark plug 41 and the side electrode 422 of the second spark plug 42 may be oriented in the same direction, as illustrated, for example, in FIG. 5.

In the above configuration, the first spark plug 41 is placed to the exhaust side with respect to the axis X of the cylinder 23, and the second spark plug 42 is placed to the intake side with respect to the axis X of the cylinder 23. Instead, the first spark plug 41 and the second spark plug 42 may be placed, across the axis X of the cylinder 23, from each other along the crankshaft (a vertical direction in the top view of FIG. 2).

In addition, instead of providing the two spark plugs 41 and 42 for one cylinder 23, one spark plug may be provided for one cylinder 23. The one spark plug may be provided to either the intake side or the exhaust side across from the axis X of the cylinder 23. Moreover, the one spark plug may be provided to either side, across from the axis X of the cylinder 23, along the crankshaft.

What is claimed is:

1. An internal combustion engine comprising:
    a piston inserted into a cylinder and having a cavity on a top face, of the piston, defining the combustion chamber, the cavity being formed symmetrically with respect to an axis of the cylinder;
    an injector provided to a cylinder head and aligned with the axis, of the cylinder, on a cylinder head bottom face defining the combustion chamber, the injector being configured to inject fuel into the cavity; and
    a spark plug including a center electrode and side electrode, the spark plug being configured to ignite air-fuel mixture in the combustion chamber, wherein
    the injection of the fuel by the injector creates a flow of gas in the combustion chamber, the gas expanding in a radial fashion from the axis of the cylinder along a surface of the cavity toward a radial outside of the cylinder, and then flowing from the radial outside of the cylinder along the cylinder head bottom face of the cylinder head toward the axis of the cylinder,
    the spark plug has a gap between the center electrode and the side electrode so that the gap is positioned in the flow of the gas from the radial outside of the cylinder along the cylinder head bottom face toward the axis of the cylinder,
    the gap is positioned, at the cylinder head bottom face, away from the axis of the cylinder toward the radial outside of the cylinder at a predetermined distance, and placed radially inwardly from a position opposite a rim of an opening of the cavity,
    the side electrode extends to be oriented in a direction perpendicular to the flow of the gas from the radial outside of the cylinder along the cylinder head bottom face toward the axis of the cylinder, and
    the gap has a center positioned near the cylinder head bottom face, and closer to an interior of the combustion chamber than to the cylinder head bottom face.

2. The internal combustion engine of claim 1, wherein the injector is configured to inject the fuel when the piston reaches near a compression top dead center.

3. The internal combustion engine of claim 1, further comprising
    a first spark plug acting as the spark plug, and a second spark plug placed across the axis of the cylinder from the first spark plug, and including a center electrode and the side electrode, wherein
    the second spark plug has a gap between the center electrode and the side electrode of the second spark plug so that the gap is positioned in the flow of the gas from the radial outside of the cylinder along the cylinder head bottom face toward the axis of the cylinder,
    the gap of the second spark plug is positioned, at the cylinder head bottom face, away from the axis of the cylinder toward the radial outside of the cylinder at the predetermined distance, and placed radially inwardly from a position opposite the rim of the opening of the cavity,
    the side electrode of the second spark plug extends to be oriented in a direction perpendicular to the flow of the gas from the radial outside of the cylinder along the cylinder head bottom face toward the axis of the cylinder, and
    the gap of the second spark plug has a center positioned near the cylinder head bottom face, and closer to the interior of the combustion chamber than to the cylinder head bottom face.

4. The internal combustion engine of claim 2, further comprising
    a first spark plug acting as the spark plug, and a second spark plug placed across the axis of the cylinder from the first spark plug, and including a center electrode and a side electrode, wherein
    the second spark plug has a gap between the center electrode and the side electrode of the second spark plug so that the gap is positioned in the flow of the gas from a radial outside of the cylinder along the cylinder head bottom face toward the axis of the cylinder,
    the gap of the second spark plug is positioned, at the cylinder head bottom face, away from the axis of the cylinder toward the radial outside of the cylinder at the predetermined distance, and placed radially inwardly from a position opposite the rim of the opening of the cavity,
    the side electrode of the second spark plug extends to be oriented in a direction perpendicular to the flow of the gas from the radial outside of the cylinder along the cylinder head bottom face toward the axis of the cylinder, and
    the gap of the second spark plug has a center positioned near the cylinder head bottom face, and closer to the interior of the combustion chamber than to the cylinder head bottom face.

5. The internal combustion engine of claim 3, wherein the cylinder head has two intake ports and two exhaust ports, one of the first spark plug or the second spark plug is placed between the two intake ports, and an other one of the first spark plug or the second spark plug is placed between the two exhaust ports.

6. The internal combustion engine of claim 4, wherein the cylinder head has two intake ports and two exhaust ports, one of the first spark plug or the second spark plug is placed between the two intake ports, and an other one of the first spark plug or the second spark plug is placed between the two exhaust ports.

7. The internal combustion engine of claim 3, wherein the side electrode of the first spark plug and the side electrode of the second spark plug each face an opposite direction.

8. The internal combustion engine of claim 4, wherein the side electrode of the first spark plug and the side electrode of the second spark plug each face an opposite direction.

9. The internal combustion engine of claim 5, wherein the side electrode of the first spark plug and the side electrode of the second spark plug each face an opposite direction.

10. The internal combustion engine of claim 6, wherein the side electrode of the first spark plug and the side electrode of the second spark plug each face an opposite direction.

11. The internal combustion engine of claim 1, wherein the spark plug is positioned in a center between the injector and an interior surface of the cylinder.

12. The internal combustion engine of claim 1, wherein the cavity includes a projection and a depressed portion, the projection rising toward the cylinder head bottom face on the axis of the cylinder, and the depressed portion, having a circumferential side surface inclined with respect to the axis of the cylinder, to be depressed around the projection and to have a diameter expanding from a bottom of the cavity toward the opening.

13. The internal combustion engine of claim 1, wherein the cylinder head bottom face is shaped into a pentroof having slopes each rising from one of an intake side or an exhaust side toward the axis of the cylinder.

14. The internal combustion engine of claim 1, wherein a distance between the center of the gap and the cylinder head bottom face is set in a range from 0 mm to 2 mm.

* * * * *